United States Patent [19]

Stein et al.

[11] 4,348,870

[45] Sep. 14, 1982

[54] TEMPERATURE PROBE FOR AIR CONDITIONING DEVICE

[75] Inventors: John C. Stein; Donald W. Hutchison, both of Fort Wayne, Ind.

[73] Assignee: Essex Group, Inc., Fort Wayne, Ind.

[21] Appl. No.: 259,341

[22] Filed: May 1, 1981

[51] Int. Cl.³ .............................................. F25D 21/02
[52] U.S. Cl. ........................................ 62/140; 62/150; 338/22 R; 374/165
[58] Field of Search ................... 62/150, 80, 140, 272; 338/22 R, 28, 307, 308; 73/362 AR; 236/DIG. 6

[56] References Cited

U.S. PATENT DOCUMENTS

| | | | |
|---|---|---|---|
| 2,081,479 | 5/1937 | Fink | 236/DIG. 20 |
| 2,128,794 | 8/1938 | Billings | 62/201 |
| 2,496,466 | 2/1950 | Graham | 62/201 |
| 2,594,502 | 4/1952 | Sahs | 62/201 |
| 3,113,458 | 12/1963 | Kimbell et al. | 338/308 X |
| 3,435,400 | 3/1969 | Beckman | 338/28 |
| 3,483,750 | 12/1969 | Pratt | 73/362 AR X |
| 3,734,402 | 5/1973 | Morgan | 236/21 B |
| 3,845,443 | 10/1974 | Fisher | 338/28 X |
| 4,171,621 | 10/1979 | Trelease | 62/160 |

*Primary Examiner*—William E. Tapolcai
*Attorney, Agent, or Firm*—Stephen A. Schneeberger

[57] ABSTRACT

A temperature probe for use with an air conditioning device of the type including a heat exchanger subject to possible freeze-up, such as an evaporator tube array. The probe includes a substantially rigid support member having an elongated portion with a temperature sensor mounted thereto, as within a recess therein, for insertion into the tube array. Electrical temperature signals from the sensor are transmitted, as by electrical leads, to a use location and device. The rigid support member of the probe includes a limiting portion extending transversely of the elongated portion for limiting insertion into the tube array and thereby positioning the sensor. A second temperature sensor may be located on the support member so as to be external of the tube array for developing the air temperature signal. Both sensors may be thermistors. The elongated portion of the support member is sized for close-fitting insertion between a pair of fins which normally extend transversely of the tube runs. A protective covering may insulate the sensors and electrical leads from mechanical damage and/or electrical contact with the fins.

17 Claims, 4 Drawing Figures

→TO CONTROLLER

→ TO CONTROLLER

TEMPERATURE PROBE FOR AIR CONDITIONING DEVICE

DESCRIPTION

1. Technical Field

This invention relates to temperature probes and more particularly to temperature probes for use with air conditioning devices. More particularly still, the present invention relates to a temperature probe for use with an air conditioning device of the type including an evaporator tube array.

2. Background Art

Air conditioning devices, including heat pumps, which compress, condense and expand a fluid working medium are well known. Such air conditioning devices are capable of either cooling or heating the surrounding air or other medium, depending upon the mode or cycle of operation. Briefly, the working medium is compressed, usually in the vapor phase, in a compressor; is then passed through a condenser where it is cooled and becomes a liquid; is next expanded at an expansion valve to become a vapor and is passed through an evaporator in the vapor phase and is finally returned to the compressor. The expansion and vaporization of the working medium at the entry end of the evaporator result in a rapid cooling of the evaporator section or coils. If the surrounding air is to be cooled, that air is caused to pass over the evaporator coils. Depending, however, upon various conditions such as the temperature of the air, its humidity and the operating levels and heat transfer efficiencies of the air conditioning device, moisture may accummulate on the external surface of the evaporator coils and form ice and/or the working medium may thicken or solidify within those coils. This condition, termed "freeze-up," interferes with the continued effective operation of the device by inhibiting airflow and/or heat transfer, and may damage the compressor if continued. Accordingly, it is sometimes the practice with such air conditioning devices to provide some form of freeze-up protection by sensing some minimum temperature at, in, or near the evaporator coils and causing the compressor of the air conditioning device to cease operation for some interval to allow warming and the ice to melt.

Prior art techniques for sensing freeze-up have, in heat pumps, generally affixed a temperature sensor directly to the evaporator coil, as by some mechanical connection or suitable adhesive. Some freeze-up protection has been provided by biasing the room air sensor through thermal coupling to the evaporator fins. These techniques, however, are generally time consuming and cumbersome to effect during manufacture and may be messy, as where various adhesive tapes and putties are used. Typically, such freeze-up sensor mounting arrangements encumber the repair and/or replacement of the sensor if such should be necessary.

For controlling the air cooling function of the air conditioning device, it has been conventional to mount an air temperature sensor upstream of the evaporator coils relative to the direction of airflow. That room air-temperature sensor has typically been supported by a fixed mount, rigidly connected to the evaporator coil and/or fin assembly. That sensor mount displaces the sensor from the coils, but the spacing is sufficiently small and the thermal conductivity of the mount is such that some thermal effect of the cold coils is also sensed to provide an indication of freeze-up. However, that freeze-up protection has not been particularly accurate or reliable and can only serve as an approximation of freeze-up because of variations in the mounting positions and the mount materials and because the sensor is substantially spaced from the coils. Moreover, that type of sensor mount is relatively bulky.

Accordingly, it is the principal object of the present invention to provide a temperature probe for use with air conditioning devices which overcomes the aforementioned shortcomings of prior art temperature sensing mounting arrangements. Included within this object is the provision of a temperature probe which is easily mounted in and removed from operative association with the air conditioning device.

It is a further object of the present invention to provide a temperature probe for an air conditioning device which consolidates the mounting therewith of a freeze-up sensor and an air temperature sensor.

DISCLOSURE OF THE INVENTION

According to the present invention, there is provided a temperature probe for use with an air conditioning device of the type including a heat exchanger subject to possible freeze-up, such as an evaporator tube array. The temperature probe includes a substantially rigid support member having an elongated portion and a temperature sensor mounted to the elongated portion for insertion into the air conditioning device tube array. Electrical temperature signals from the sensor are transmitted to a use location, such as a controller, as by etched or deposited printed conductive leads and/or lead wires. The rigid support member of the probe includes a limiting portion extending transversely of the elongated portion for engaging one or more of tube runs of the array to limit insertion of the probe and thereby place the sensor in an operative position. A second temperature sensor may be located on the support member such that it is positioned externally of the tube array when the probe is operatively mounted, this sensor serving to develop the air temperature signal. Both sensors may conveniently be thermistors.

The elongated portion of the probe support member is sized for close-fitting insertion between a pair of adjacent fins which normally extend transversely of the evaporator tube runs. An insulating covering and/or tubing may envelop the elongated portion of the support member to prevent electrical contact between the temperature sensor and the fins and to prevent moisture intrusion. The temperature sensors are preferably mounted in recesses in the probe support member. A thermal delay covering may substantially envelop the air temperature sensor.

BEST MODE FOR CARRYING OUT THE INVENTION

Figure 1:
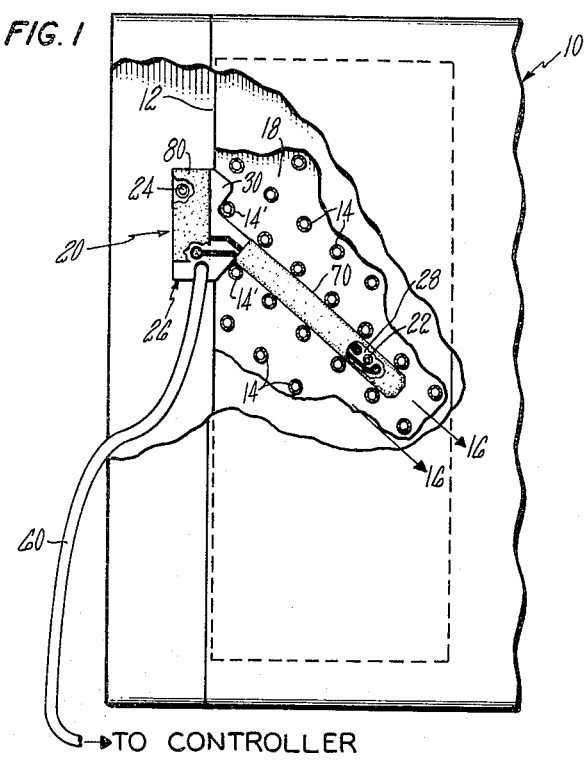
FIG. 1 is a sectional side elevation of an air conditioning device, partly broken away, to illustrate the temperature probe of the invention installed therewithin.
Figure 2:
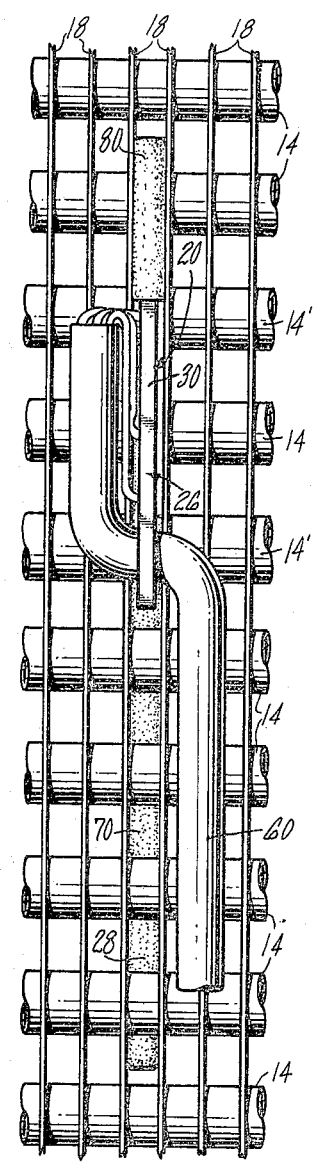
FIG. 2 is an enlarged front elevational view of a portion of the air conditioning device of FIG. 1, showing the temperature probe installed therewithin.

Referring to FIG. 1, there is depicted that portion of an air conditioning device 10 which houses the evaporator, generally designated 12, and comprised of an array of substantially horizontal parallel runs of tubes 14, seen also in FIG. 2. Tube runs 14 are normally comprised by a single tube coursing back and forth, linearly or curvilinearly, within the air conditioning device 10, although other possible arrangements may also provide the evaporator tube array 12. It will be observed that the arrangement of tube runs 14 is such as to provide a plurality of channels, indicated by arrows 16, between adjacent rows of tube runs and extending into the evaporator tube array 12. Those tube runs are so arranged in the illustrated embodiment as to also incline channels 16 downwardly as they extend into the array 12.

In addition to the tube runs 14, the evaporator 12 additionally includes a large number of thin, sheet-like fins 18 extending transversely of the tube runs 14 substantially vertically through the array 12. In fact, the various tube runs 14 pass through respective openings in the fins 18 in close-fitting relationship therewith for mechanical support and good thermal coupling. The fins 18 are parallel and closely spaced to one another, being separated by only about 0.06–0.12 in. The fins 18 serve to greatly increase the effective surface area of tubes 14 for the purpose of cooling the air, and are at or near the temperature of the tubes 14.

Figure 3:
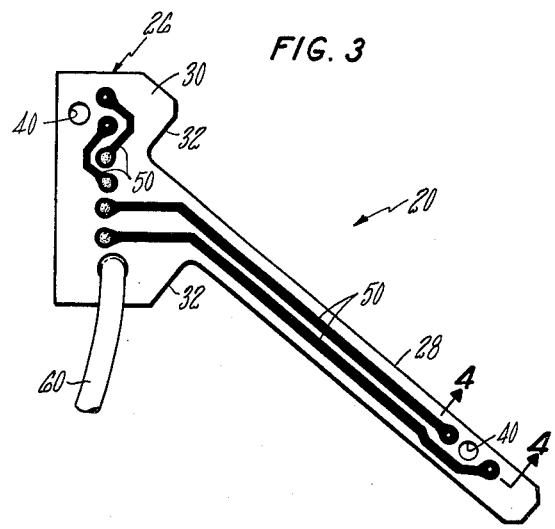
FIG. 3 is a detailed side elevational view of the temperature probe prior to the installation of the sensors.
Figure 4:
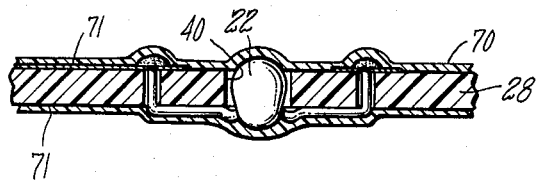
FIG. 4 is an enlarged sectional view of the temperature probe taken along the line 4—4 of FIG. 3 and illustrating a thermistor mounted therein.

Consideration is now given to the temperature probe 20 of the invention, shown installed in the evaporator tube array 12 in FIGS. 1 and 2 and in isolation in FIGS. 3 and 4. Probe 20 consists of at least one temperature sensor 22, and preferably also a second temperature sensor 24, mounted on a substantially rigid support member, such as board 26. The board 26 is advantageously a printed circuit board of glass-reinforced resin on which conductive contact pads and circuit leads may be printed. Board 26 generally includes an elongated portion 28 on which the freeze-up sensor 22 is mounted and a retaining portion 30 on which the air temperature sensor 24 is mounted. At least the elongated portion 28, and typically the entirety of board 26 has a thickness in the range of about 0.05–0.1 in. to provide close-fitting insertion of the elongated portion 28 between an adjacent pair of fins 18 and into a channel 16 in the tube array 12.

The limiting portion 30 of board 26 extends generally transversely of the elongated portion 28, with the elongated portion making an angle therewith which substantially corresponds with the angle downward incline of the channel 16 between adjacent rows of tube runs 14. The inwardly facing surfaces 32 of limiting portion 30 immediately above and below the corners formed by the intersections of the elongated portion 28 therewith serve to limit the inward insertion of probe 20 into tube array 12 by engaging a respective pair of tubes, designated 14' in FIG. 1.

The elongated portion 28 of board 26 is of sufficient length to extend well within the tube array 12 and the temperature sensor 22 is mounted toward the distal end thereof. Sensors 22 and 24 are preferably suitable thermistors known in the art, however, it will be appreciated that other relatively compact forms of temperature sensing elements such as RTD's, thermocouples, and semiconductors might be used. Both thermistors 22 and 24, though especially freeze-up thermistor 22, are positioned within recesses formed in the surface of the support board 26. As illustrated in FIG. 4, such recesses are conveniently provided by a hole or bore 40 extending entirely through the thickness of the board. Thermistors 22 and 24 are sufficiently small that they do not extend substantially beyond the thickness of the board on either side. The leads from the thermistors 22, 24 extend through small feed-through holes in the board to printed circuit contact pads to which they are soldered on the opposite surface of the board. The air temperature sensing thermistor 24 is mounted at a position on limiting portion 30 of board 26 which positions it at about one-quarter to three-quarters of an inch upstream of the evaporator tube array 12, including fins 18, in the incoming airstream.

Printed circuit leads 50 on board 26, illustrated in FIG. 3, conduct the electrical temperature signals developed by thermistors 22 and 24 to a terminal position on the limiting portion 30 of the board. A 3 or 4 conductor cable 60, connected at one end to the terminals for the printed circuit conductors from thermistors 22, 24, conducts the respective temperature signals to a controller (not shown) for effecting suitable control action. The four individually insulated conductors within cable 60 feed from one end of the cable through small feed-through holes in board 26 to their respective contact pads on the board. The cable 60 extends in the opposite direction through a strain-relief opening in the board 26 for extension to and connection with the controller.

An insulating covering or envelope is provided about freeze-up thermistor 22 and the various leads extending therefrom along the elongated portion 28 of the board to minimize moisture absorption, to prevent short-circuiting by contact with the electrically conductive fins 18 which are typically of aluminum and to prevent damage during probe insertion. The elongated portion 28 of the board is dip-coated with a thin conformal coating of a suitable synthetic resin, such as PC-101 manufactured by Pan American Research & Development Corporation of Garland, texax, represented by the darkened line 71 in FIG. 4, to provide a degree of electrical and moisture isolation. Then, before coating 71 has completed cured, a section of shrink-fit plastic tubing 70 is slid over the elongated portion 28 of board 26 and is shrunken, as by heating, into close-fitting moisture-tight permanent engagement therewith via intermediate bonding and sealing coating 71. The total thickness of the elongated portion 28 of the board and the shrink tubing 70 thereover, typically being about 0.10–0.14 in., is such as to provide a snug interference fit between an adjacent pair of fins 18. This fit substantially prevents dislodgement and unintended withdrawal of probe 20 from the tube array 12 and provides good thermal contact between the thermistor 22 and fins 18 via shrink tubing 70. The downward incline of the extended portion 28 of the probe may also assist somewhat in probe retention.

A thin envelope of thermal insulating material, as for instance foam tape 80, is placed on board 26 so as to envelop room temperature sensor thermistor 24 for the purpose of delaying the response of thermistor 24 to transients in the temperature of the sensed air. This provision is generally desirable to prevent the thermistor from sensing and the controller from ultimately responding to a condition which may only be transient and warrant no response. For instance, it is desirable to prevent chilled air exiting air conditioner 10 from being reflected onto thermistor 24 and sensing an inaccurately low room temperature when a person briefly stands or passes in front of the air conditioner. The foam tape 80 serves, in effect, as a thermal integrator and effectively prevents thermistor 24 from sensing temperatures which are transient and less than about 30-90 seconds in duration. The foam tape 80 also affords some mechanical protection to the thermistor 24 and electrically isolates certain solder points from fins 18, if necessary.

Finally, the limiting portion 30 of the probe board 26, including tape 80 and the proximal end of tubing 70, may be dip coated with a thin water-resistant and mechanical shock resistant plastic, vinyl-like material, not shown, to maintan the integrity of the probe, particularly against moisture.

Installation of probe 20 is accomplished simply by inserting the elongated portion 28 between a pair of fins 18 downwardly into a channel 16 in the array 12 until limited by contact of surfaces 32 with tubes 14'. The thickness or probe portion 28 is typically 0.02-0.04 in. greater than the spacing between adjacent fins 18 to ensure retention and good thermal contact. It may be desirable to slightly expand and flare the spacing between the leading edges of the pair of fins 18 prior to probe insertion to avoid cutting the covering 70 and damaging the thermistor 22. The fins 18 are sufficiently compliant to accommodate the expansion deformation occasioned by the insertion of the probe 20.

Freeze-up thermistor 22 senses the temperature existing within the evaporator tube array 12 and utilizes the signal thereby developed as an indication of freeze-up or insipient freeze-up. Because of the proximity of thermistor 22 to fins 18, the sensed temperature is very nearly that of the tubes 14 themselves. The sensed temperature may be substantially the same as one of the tubes 14 if the thermistor 22 is positioned immediately adjacent that tube. The normal control response to an indication of freeze-up is a termination of the operation of the compressor and a continuation of airflow over the evaporator coils until a secondary "safe" temperature, i.e. 50° F., is sensed whereupon normal operation may resume. The probe 20 may be manually withdrawn from the tube array 12 with a minimum of effort for maintenance or replacement.

It will be understood that the location of the evaporator coils which are subject to freeze-up will differ between air conditioning devices for room-cooling and those for room-heating, as heat pumps, however, the probe is similarly applicable to either. For reversible cycle heat pumps, it may be desirable to position a probe in each coil array which may serve as an evaporator.

Although this invention has been shown and described with respect to detailed embodiments thereof, it will be understood by those skilled in the art that various changes in form and detail thereof may be made without departing from the spirit and scope of the claimed invention.

We claim:

1. A temperature probe for use with an air conditioning device of the type including a heat exchanger tube array comprised of a plurality of tube runs, said probe comprising:

a substantially rigid support member having an elongated portion, said elongated portion being slidably insertable into and out of said tube array externally of the respective tube runs;

temperature sensing means mounted to said elongated portion of said support member for insertion therewith into said tube array to provide a signal representative of the temperature thereat; and means for transmitting the temperature signal of said sensing means to a use location.

2. A temperature probe for use with an air conditioning device of the type including a heat exchanger tube array comprised of a plurality of tube runs, said probe comprising:

a substantially rigid support member having an elongated portion and a limiting portion, said elongated portion being insertable into said tube array externally of the respective tube runs and including a sensor station thereon and said limiting portion extending transversely of said elongated portion and being of such length and orientation as to engage at least one tube run of said array and thereby positioned said elongated portion sensing station by limiting further insertion of said elongated portion into said tube array; temperature sensing means mounted to said elongated portion of said support member at said sensing station for insertion therewith into said tube array to provide a signal representative of the temperature thereat; and means for transmitting the temperature signal of said sensing means to a use location.

3. The probe of claim 2 wherein part of said support member is positioned externally of said tube array when said limiting portion thereof is in said limiting engagement with said tube run and including an other temperature sensing means mounted on part of said support means for positioning externally of said tube array.

4. The probe of claim 3 wherein said temperature sensing means and said other temperature sensing means are each thermistors.

5. The probe of claim 4 wherein said support member includes a pair of spaced recesses in the surface thereof and each of said thermistors is mounted within a respective said recess to minimize any extension thereof beyond the surface of said support member.

6. The probe of claim 2 wherein said air conditioning device includes a plurality of closely spaced fins extending transversely of said tube runs and within said tube array and wherein said elongated portion of said probe support member is sized for close-fitting engagement with a pair of adjacent fins when inserted therebetween thereby to frictionally resist removal.

7. The probe of claim 6 wherein said fins are electrically conductive, said temperature sensing means is a thermistor, and including a protective cover of electrically insulating material sufficiently enveloping at least said thermistor to electrically isolate said thermistor from said fins.

8. The probe of claim 6 including a moisture-resistant protective cover substantially enveloping a portion of said elongated portion of said probe support member including said temperature sensing means in moisture-tight sealing relationship therewith.

9. The probe of claim 8 wherein said protective cover comprises a thin first conformal coating of sealant material and a second overlying covering provided by a heat shrink tubing in intimate engagement with said first coating.

10. A temperature probe for use with an air conditioning device of the type including a heat exchanger tube array comprised of plurality of tube runs, said probe comprising:

a substantially rigid support member having an elongated portion, said elongated portion being insertable into said tube array externally of the respective tub runs;

first and second temperature sensing means, said first temperature sensing means being mounted to said elongated portion for said insertion into said tube array and said second temperature sensing means being mounted on said support member and being located externally of said tube array when said first temperature sensing means is so positioned within said array; and means for transmitting the temperature signals of said first and said second temperature sensing means to a use location.

11. The probe of claim 10 wherein each of said first and second temperature sensing means is a thermistor.

12. The probe of claim 10 including thermal delay means substantially enveloping said second temperature sensing means for minimizing the effects of transient thermal conditions on said other temperature sensing means.

13. The probe of claim 12 wherein said thermal delaying means comprises an insulating foam tape.

14. A temperature probe for use with an air conditioning device of the type including a heat exchanger tube array comprised of a plurality of tube runs and a plurality of closely spaced vertical fins extending transversely of said tube runs and within said tube array, said probe comprising:

a substantially rigid support member having an elongated portion, said elongated portion being insertable into said tube array externally of the respective tube runs and being sized for close-fitting engagement with a pair of adjacent fins when inserted therebetween thereby to frictionally resist removal.

15. The probe of claim 14 wherein the tube array includes numerous horizontal tube runs, said tube runs defining therebetween at least one open channel extending transversely thereof downwardly into said array, said elongated portion of said probe support member being insertable downwardly into said tube array channel.

16. The probe of claim 14 wherein said fins provide a good thermal connection between said tube runs and said temperature sensing means on said probe elongated portion.

17. A temperature probe for use with an air conditioning device of the type including a heat exchanger tube array comprised of a plurality of tube runs, said probe comprising:

a substantially rigid support member having an elongated portion, said support member being a printed circuit board and said elongated portion being insertable into said tube array externally of the respective tube runs;

temperature sensing means mounted to said elongated portion of said support member for insertion therewith into said tube array to provide a signal representative of the temperature thereat; and means including printed circuit leads on said board for transmitting the temperature signal of said sensing means to a use location.

* * * * *